(12) United States Patent
Kuehnemund et al.

(10) Patent No.: US 6,260,578 B1
(45) Date of Patent: Jul. 17, 2001

(54) SPUD ASSEMBLY FOR A FUEL TANK

(75) Inventors: Bruce Albert Kuehnemund, Flushing; Darrel B. Smith, Grand Blanc; Gary Francis Stack, Fenton, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/372,728

(22) Filed: Aug. 12, 1999

(51) Int. Cl.[7] .................................................. F16K 15/04
(52) U.S. Cl. ......................................... 137/592; 137/515.5
(58) Field of Search ............................... 137/592, 533.11, 137/533.13, 515.5, 590; 220/86.2; 141/348

(56) References Cited

U.S. PATENT DOCUMENTS

| 4,501,374 | * | 2/1985 | Robertson ........................ 137/850 X |
| 5,044,391 | * | 9/1991 | Brumfield .................... 137/533.11 X |
| 5,568,828 | * | 10/1996 | Harris ................................ 137/587 X |
| 5,660,206 | | 8/1997 | Neal et al. . | |

* cited by examiner

*Primary Examiner*—Kevin Lee
(74) *Attorney, Agent, or Firm*—John A. VanOphem

(57) ABSTRACT

A spud assembly for a fuel tank in a vehicle includes a flange tower adapted to be at least partially disposed in a fill spout of a fuel tank. The spud assembly also includes a bead flange extending from the flange tower for engagement with a tank filler neck tube to retain the tank filler neck tube thereto. The spud assembly further includes a check valve disposed within the flange tower to allow fuel to enter the fuel tank from the tank filler neck tube and prevent fuel from exiting the fuel tank to the tank filler neck tube.

19 Claims, 1 Drawing Sheet

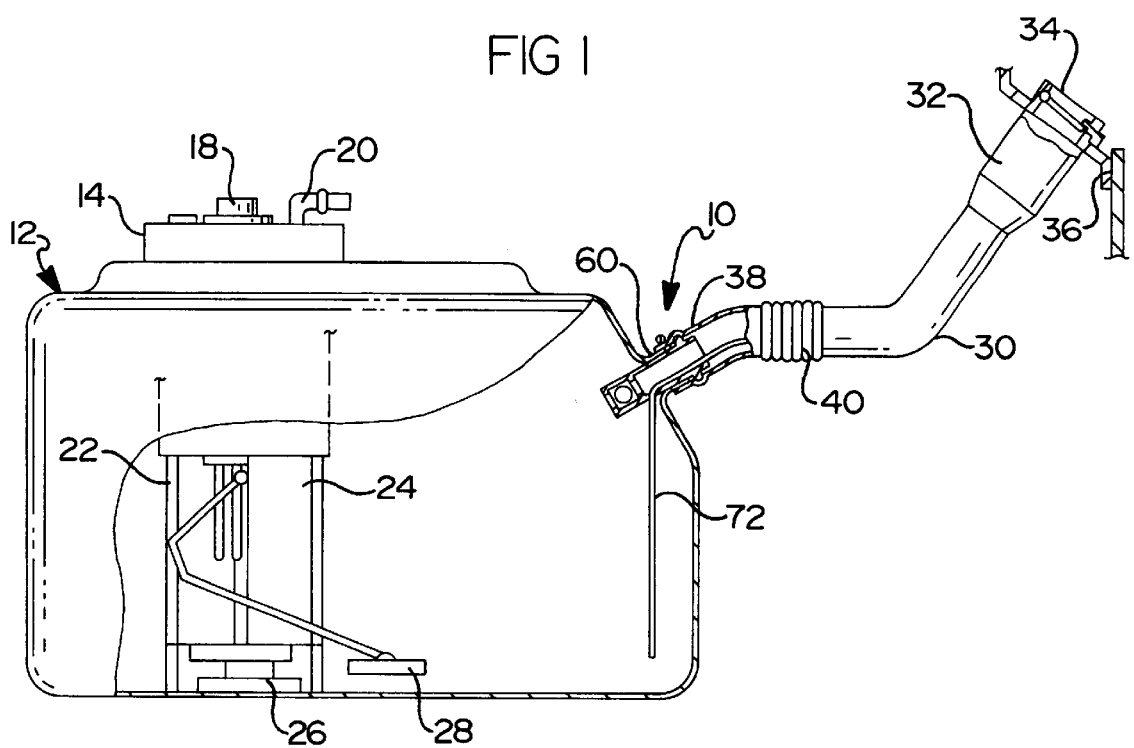
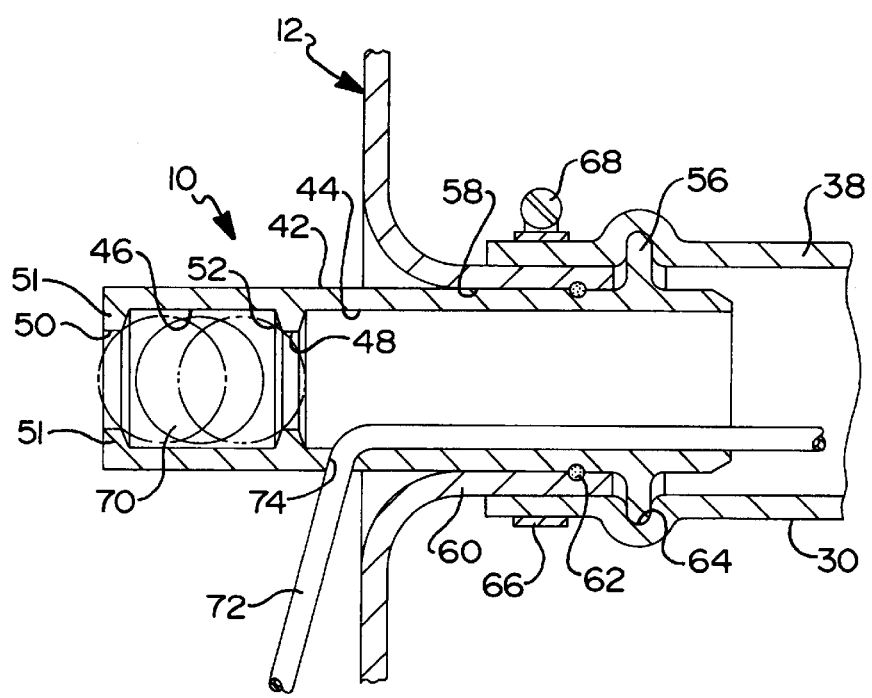

SPUD ASSEMBLY FOR A FUEL TANK

TECHNICAL FIELD

The present invention relates generally to fuel tanks for vehicles and, more particularly, to a spud assembly for a fuel tank of a vehicle.

BACKGROUND OF THE INVENTION

It is known to provide a fuel tank such as a plastic fuel tank in a vehicle to hold fuel to be used by an engine of the vehicle. In some vehicles, a tank filler neck tube extends between a cap and the plastic fuel tank. Typically, the filler neck includes a fill-valve insert telescoped around the exterior of a tank end of the tank filler neck tube and the fill-valve insert has an upper annular ring to receive and seal around an exterior of the tank end of the tank filler neck tube. The fill-valve insert is positively retained against outward dislodgment from a tank fill spout of the fuel tank by a lock ring collar in the event the tank filler neck tube is pulled loose from its compression seal frictional clamp retention in the collar.

Another method is to attach a spud assembly to a plastic fuel tank using a face welding such as hot plate welding, spin welding, etc. Typically, this type of weld is prone to fatigue from shear and cantilever loading due to the weld being under a shear force.

Although the above spud assembly has worked, it is desirable to provide a spud assembly for a fuel tank in a vehicle that is more robust. It is also desirable to provide a spud assembly for a fuel tank in a vehicle that eliminates a tank to spud weld zone. It is further desirable to provide a spud assembly for a fuel tank in a vehicle that incorporates a check valve and tank drain in the tank filler neck tube.

SUMMARY OF THE INVENTION

It is, therefore, one object of the present invention to provide a spud assembly for a fuel tank in a vehicle.

It is another object of the present invention to provide a spud assembly for a fuel tank in a vehicle that eliminates a tank to spud weld zone.

It is yet another object of the present invention to provide a spud assembly for a fuel tank in a vehicle that incorporates a check valve and tank drain in a tank filler neck tube.

To achieve the foregoing objects, the present invention is a spud assembly for a fuel tank in a vehicle including a flange tower adapted to be at least partially disposed in a fill spout of a fuel tank. The spud assembly also includes a bead flange extending from the flange tower for engagement with a tank filler neck tube to retain the tank filler neck tube thereto. The spud assembly further includes a check valve disposed within the flange tower to allow fuel to enter the fuel tank from the tank filler neck tube and prevent fuel from exiting the fuel tank to the tank filler neck tube.

One advantage of the present invention is that a spud assembly is provided for a fuel tank in a vehicle. Another advantage of the present invention is that the spud assembly eliminates a tank to spud weld zone and incorporates a check valve and tank drain in the tank filler neck tube. Yet another advantage of the present invention is that the spud assembly forms a flange tower or spud out of the same material for the tank when the tank is formed. Still another advantage of the present invention is that the spud assembly is simpler and more robust, reduces spit back during filling and allows the fuel tank to be drained without dropping it from the vehicle. A further advantage of the present invention is that the spud assembly is lower in cost, has improved quality and does not require high tech equipment for assembly.

Other objects, features and advantages of the present invention will be readily appreciated, as the same becomes better understood after reading the subsequent description taken in conjunction with the accompanying drawings.

BRIEF DESCRIPTION OF THE DRAWINGS

FIG. 1 is a fragmentary elevational view of a spud assembly, according to the present invention, illustrated in operational relationship with a fuel tank of a vehicle.

FIG. 2 is an enlarged fragmentary plan view of the spud assembly of FIG. 1 illustrating a check valve in an open and closed position.

DESCRIPTION OF THE PREFERRED EMBODIMENT

Referring to the drawings and in particular FIGS. 1 and 2, one embodiment of a spud assembly 10, according to the present invention, is shown for a fuel tank, generally indicated at 12, in a vehicle (not shown). The fuel tank 12 includes a fuel pump module 14 therein with a removable cover 16 sealed to the top of the fuel tank 12 with an electrical connector 18 and a fuel line outlet connector 20. The fuel tank 12 also includes a fuel reservoir 22 which contains an electrical fuel pump 24 with an inlet 26 and a float gage 28 to indicate fuel level. The fuel tank 12 also includes a tank filler neck tube 30 having an upper end 32 provided with a removable fuel cap 34 and mounted in a vehicle body 36 of the vehicle. The tank filler neck tube 30 also has a lower end 38 and a flex segment 40 interconnecting the lower end 38 and a portion of the upper end 32. The fuel tank 12 is formed of a plastic material such as laminated polyethylene with an embedded vapor barrier film. The fuel tank 12 is formed by a twin sheet vacuum thermo-forming process. It should be appreciated that, except for the spud assembly 10, the fuel tank 12 is conventional and known in the art.

Referring to FIGS. 1 and 2, the spud assembly includes a spud or flange tower 42. The flange tower 42 is generally cylindrical in shape with a generally circular cross-section. The flange tower 42 extends axially and has a first cavity 44 in one end thereof. The flange tower 42 also includes a second cavity 46 in the other end thereof. The flange tower 42 includes a first aperture 48 extending axially therethrough to allow fluid communication between the first cavity 44 and the second cavity 46. The flange tower 42 includes a second aperture 50 in the axial end thereof to allow the second cavity 46 to fluidly communicate with the interior of the tank filler neck tube 30. The flange tower 42 includes a plurality of, preferably three or four, prongs or fingers 51 extending radially to form the second aperture 50. The fingers 51 are also spaced circumferentially such that the second aperture 50 extends circumferentially therebetween. The fingers 51 form a cage to retain a check valve 70 to be described in the second cavity 46. The flange tower 42 also includes a valve seat 52 adjacent the first aperture 48 for a function to be described. The flange tower 42 is formed from a plastic material, preferably the same material as the fuel tank 12 the same time the fuel tank 12 is formed. It should be appreciated that the flange tower 42 is a monolithic structure being integral, unitary and one-piece.

The spud assembly 10 includes a bead flange 56 extending radially outwardly from the flange tower 42 to retain the tank filler neck tube 30. The flange tower 42 is disposed in an opening 58 formed by a fill spout 60 of the fuel tank 12 such that the bead flange 56 is disposed outside an end of the fill spout 60. The spud assembly 10 may include a spin weld 62 between the flange tower 42 and the fill spout 60 to secure the flange tower 42 to the fill spout 60. The tank filler neck tube 30 has a recess 64 extending radially outwardly in the lower end thereof to receive the bead flange 56. The spud assembly 10 may include a clamp 66 disposed about the lower end 38 of the tank filler neck tube 30 between the recess 64 and a free end thereof to secure the lower end 38 to the fill spout 60. The clamp 66 includes an adjustment screw 68 to allow the clamp 66 to be secured and unsecured to the tank filler neck tube 30. It should be appreciated that the clamp 66 is conventional and known in the art.

The spud assembly 10 also includes a check valve 70 disposed in the second cavity 46 and cooperating with the valve seat 52. The check valve 70 is of a spherical or ball type and has a first position engaging the first valve seat 52 to close the first aperture 48. The check valve 70 has a second position engaging the fingers 51 to open the first aperture 48. The check valve 70 is made of a rigid material such as plastic. It should be appreciated that fluid flows through the second cavity 46, past the check valve 70 and fingers 51 and through the second aperture 50 when the check valve 70 is in the second position.

The spud assembly 10 includes a fuel tank drain 72 to allow the fuel tank 12 to be drained. The fuel tank drain 72 is a conduit having one end extending through an aperture 74 in the flange tower 42 and through the first cavity 44 and into the tank filler neck tube 30 and a second end extending into the fuel tank 20. The spud assembly 10 also includes a clocking feature (not shown) to orient the fuel tank drain 72 in the same place each time after spin welding or another type of welding process. It should be appreciated that the fuel tank drain 72 may be secured in the aperture 74 by suitable means such as welding.

In operation, the spud assembly 10 is illustrated in an assembled state in which the tank filler neck tube 30 is secured to the fill spout 60 by the clamp 66. The check valve 70 engages the fingers 51 in the second position. Fuel enters the tank filler neck tube 30 when the fuel cap 34 is removed and flows to the spud assembly 10. In the spud assembly 10, fuel flows through the first cavity 44, first aperture 48, second cavity 46 around the check valve 70, and second aperture 50 and into the fuel tank 12. If the fuel vaporizes in the fuel tank 12, pressure in the fuel tank 12 may cause the check valve 70 to disengage the fingers 51 and engage the valve seat 52 to prevent fuel vapor from entering the first cavity 44 and tank filler neck tube 30. When the vehicle is moving or the fuel tank 20 is disposed at an angle such that fuel flows from the fuel tank 12 to the spud assembly 10, the fuel flows through the second aperture 50 and causes the check valve 70 to engage the valve seat 52 to prevent fuel from entering the first cavity 44 and flowing to the tank filler neck tube 30.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A spud assembly for a fuel tank in a vehicle comprising:
   a flange tower adapted to be at least partially disposed in a fill spout of a fuel tank;
   a bead flange extending from said flange tower for engagement with a tank filler neck tube to retain the tank filler neck tube thereto;
   a check valve disposed within said flange tower to allow fuel to enter the fuel tank from the tank filler neck tube and prevent fuel from exiting the fuel tank to the tank filler neck tube; and
   a weld disposed between said flange tower and the fill spout to secure said flange tower to the fill spout.

2. A spud assembly as set forth in claim 1 wherein said flange tower extends axially and is generally cylindrical in shape.

3. A spud assembly as set forth in claim 2 wherein said flange tower has a first cavity extending axially inward from one axial end thereof, said bead flange being located near the axial end.

4. A spud assembly as set forth in claim 3 wherein said flange tower has a second cavity extending axially inward from another axial end therof, said check valve being disposed in said second cavity.

5. A spud assembly as set forth in claim 4 wherein said flange tower includes an aperture extending axially therethrough and fluidly communicating with said first cavity and said second cavity.

6. A spud assembly as set forth in claim 5 wherein said flange tower includes a valve seat disposed adjacent said aperture.

7. A spud assembly as set forth in claim 4 wherein said flange tower includes an aperture extending axially from the axial end and fluidly communicating with said second cavity.

8. A spud assembly as set forth in claim 7 wherein said flange tower includes a plurality of fingers disposed adjacent said aperture for retaining said check valve in said second cavity.

9. A spud assembly as set forth in claim 1 wherein said check valve is spherically shaped.

10. A spud assembly as set forth in claim 1 wherein said flange tower is a monolithic structure formed from the same material as the fuel tank.

11. A spud assembly for a fuel tank in a vehicle comprising:
    a flange tower adapted to be at least partially disposed in a fill spout of a fuel tank;
    a bead flange extending from said flange tower for engagement with a tank filler neck tube to retain the tank filler neck tube thereto;
    a fuel tank drain extending through said flange tower to be disposed in the tank filler neck tube and the fuel tank; and
    a check valve disposed within said flange tower to allow fuel to enter the fuel tank from the tank filler neck tube and prevent fuel from exiting the fuel tank to the tank filler neck tube.

12. A spud assembly as set forth in claim 11 wherein said flange tower has a first cavity extending axially inward from one axial end thereof, said bead flange being located near the axial end.

13. A spud assembly as set forth in claim 12 wherein said flange tower has a second cavity extending axially inward from another axial end therof, said check valve being disposed in said second cavity.

14. A spud assembly as set forth in claim 13 wherein said flange tower includes an aperture extending axially therethrough and fluidly communicating with said first cavity and said second cavity.

15. A spud assembly as set forth in claim 14 wherein said flange tower includes a valve seat disposed adjacent said aperture.

16. A spud assembly as set forth in claim 13 wherein said flange tower includes an aperture extending axially from the axial end and fluidly communicating with said second cavity.

17. A spud assembly as set forth in claim 16 wherein said flange tower includes a plurality of fingers disposed adjacent said aperture to retain said check valve in said second cavity.

18. A spud assembly as set forth in claim 12 wherein said flange tower includes an aperture extending therethrough to communicate with said first cavity and wherein said fuel tank drain is a conduit extending through said aperture.

19. A fuel tank assembly for a vehicle comprising:

a fuel tank having a fill spout;

a tank filler neck tube;

a spud assembly disposed between said fuel tank and said tank filler neck tube;

said spud assembly comprising a flange tower at least partially disposed in said fill spout of said fuel tank, a bead flange extending from said flange tower and engaging said tank filler neck tube to retain said tank filler neck tube thereto, a fuel tank drain extending through said flange tower and disposed in said tank filler neck tube and said fuel tank, and a check valve disposed within said flange tower to allow fuel to enter said fuel tank from said tank filler neck tube and prevent fuel from exiting said fuel tank to said tank filler neck tube.

* * * * *